UNITED STATES PATENT OFFICE.

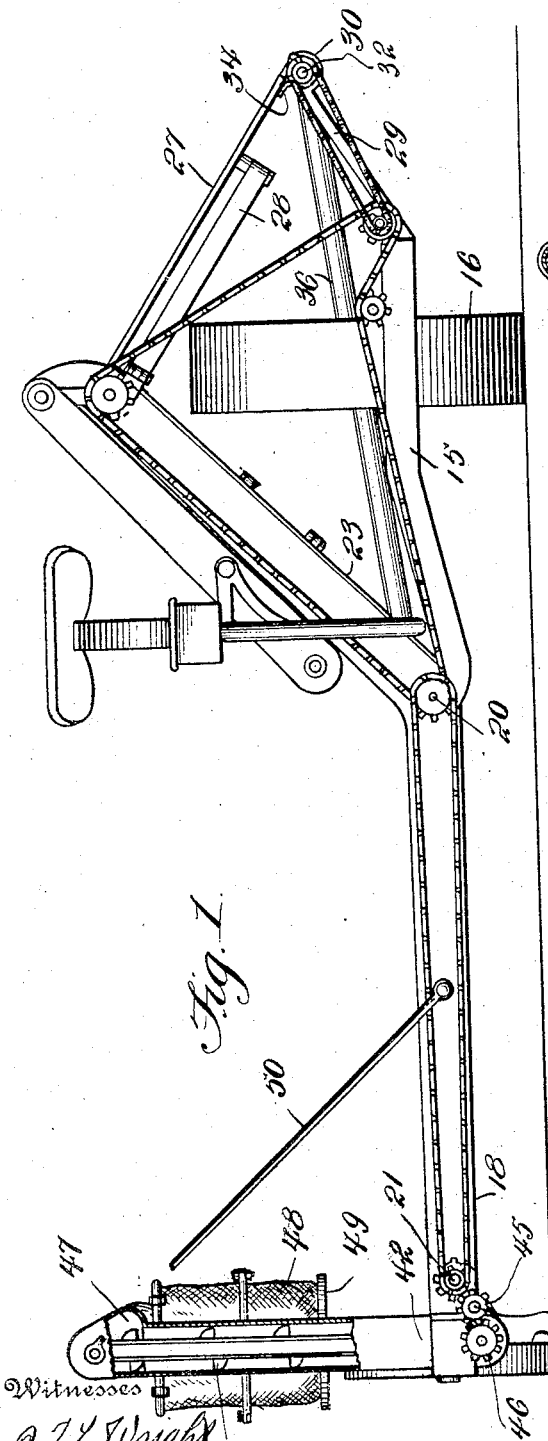
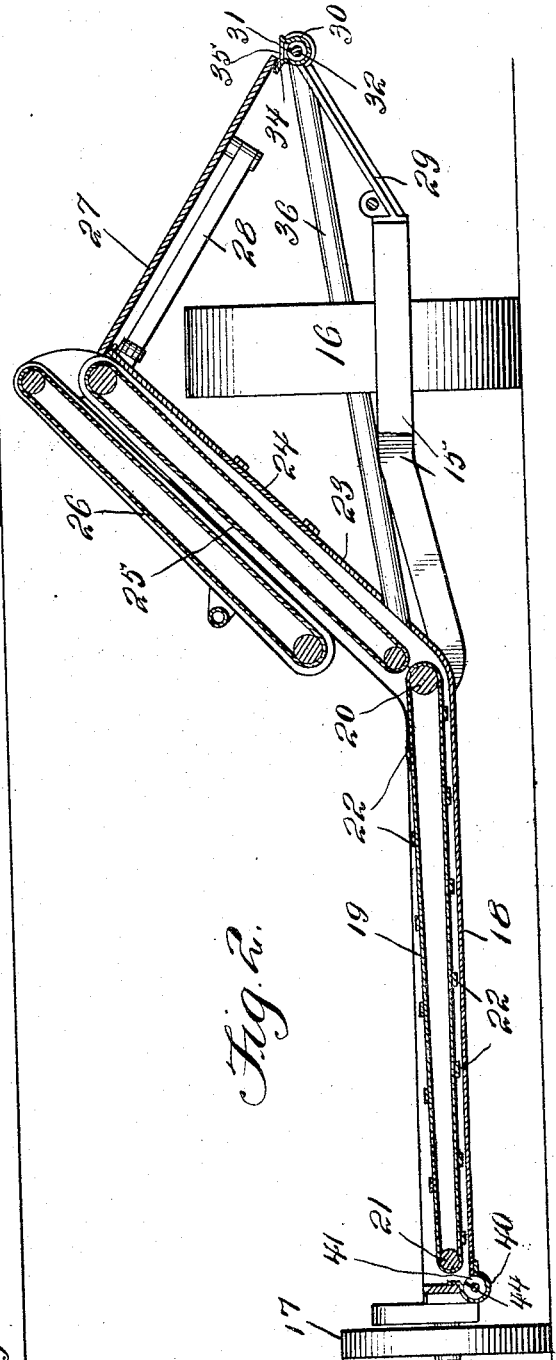

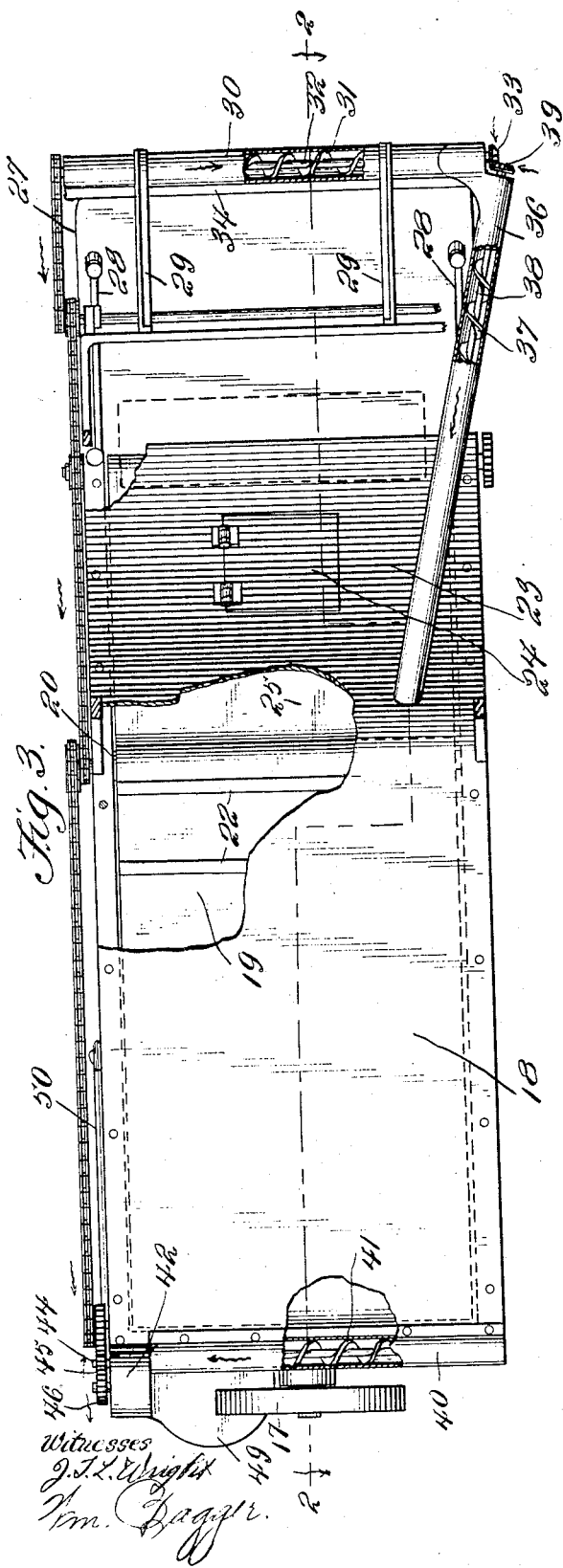

DAVID W. BOHANNON, OF ALSASK, SASKATCHEWAN, CANADA.

GRAIN-SAVING DEVICE.

1,119,677.  Specification of Letters Patent.  Patented Dec. 1, 1914.

Application filed April 28, 1914. Serial No. 835,012.

*To all whom it may concern:*

Be it known that I, DAVID W. BOHANNON, a subject of the King of Great Britain, residing at Alsask, in the Province of Saskatchewan and Dominion of Canada, have invented new and useful Improvements in Grain-Saving Devices, of which the following is a specification.

This invention relates to grain saving devices for harvesters and binders.

The invention has for its object to produce a device of simple, inexpensive and compact construction which may be readily applied to and used in connection with grain binding harvesters of various well known types.

A further object of the invention is to produce in connection with a grain saving device a simple and efficient means for conveying the grain that is saved into a suitable receptacle such as a bag which is supported in proper receiving position.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a rear elevation of a harvester and binder equipped with the invention. Fig. 2 is a vertical sectional view taken on the line 2—2 in Fig. 3. Fig. 3 is a bottom plan view with parts cut away. Fig. 4 is a side view in elevation showing the outer end of the platform and the elevating device and receptacle supported thereby. Fig. 5 is a perspective detail view of the trough and conveyer which receives the loose grain from the binder table.

Corresponding parts in the several figures are denoted by like characters of reference.

The frame 15 of the harvester and binder is supported on the bull wheel 16 and the grain wheel 17.

18 is the grain platform, and 19 is the platform apron which is guided over rollers 20, 21 and which is equipped with slats 22 that are so arranged and proportioned that in operation they will sweep over the platform 18.

The bottom plate 23 of the straw elevator is connected at its lower end with the platform 18, as best seen in Fig. 2, said bottom plate being preferably constructed of sheet metal and provided with a hinged door or trap 24 to afford convenient access from above to the bull wheel for the purpose of repairing and oiling the bearings of said bull wheel and related parts.

25 represents the lower and 26 the upper conveyer of the straw elevator which serves in the customary manner to deliver the cut straw on the binder table 27 which latter is supported by arms or links 28 that permit said binder table or deck to be shifted forwardly and rearwardly in the customary manner.

Supported below and adjacent to the lower edge of the binder deck by means of arms or brackets 29 that are connected with the frame of the machine is a trough 30 containing a screw conveyer 31, the shaft of which, 32, carries at one end a bevel pinion 33. The trough 30 is provided with a flange 34 which extends beneath the lower end of the binder deck. The trough is provided with a series of transverse bars 35 to prevent the straw from getting into the trough and interfering with the operation of the screw conveyer. The trough 30 at its discharge or delivery end communicates with a tubular casing 36 containing a screw conveyer 37, the shaft of which, 38, carries a bevel pinion 39 meshing with the pinion 33, as seen in Fig. 2. The casing 36 is arranged to discharge on to the bottom plate 23 of the straw elevator with which it suitably communicates. The conveyer shaft 32 is driven in a convenient manner from some moving part of the harvester binder on which it is mounted. Supported at the outer end of the grain platform 18, or formed integrally with said platform is a trough 40 in which operates a screw conveyer 41 which may be driven in any convenient manner from some moving part of the machine. The conveyer 41 discharges at one end thereof into the lower portion 42 of the leg or casing 42 of an elevator 43 which may derive motion from the shaft 44 of the conveyer 41 through the medium of intermeshing gears 45, 46, see Fig. 3, or in any convenient manner. The elevator 43 discharges at 47 into a bag or receptacle 48 for which a suitable support 49 may be provided on the elevator casing, the latter being reinforced by a brace 50.

From the foregoing description taken in connection with the drawings hereto annexed, the operation and advantages of this invention will be readily understood by those skilled in the art to which it appertains. It will be seen that loose grain, beaten from the straw by the reel of the machine (not shown) will drop on the platform apron and will be thereby conveyed to the platform. Grain that becomes detached from the straw in transit to the binder deck will slide over the bottom plate of the straw elevator to the platform. Grain that becomes detached from the straw while on the binder deck will find its way to the conveyer casing or trough 30 and will pass through the latter and through the casing 36 to the bottom plate 23 over which it slides to the platform. All the loose grain will thus eventually reach the platform and will be swept or scraped over the latter to the trough 40 through which it is conveyed by the screw conveyer 41 to the elevator, whereby it is transferred to the receptacle 48 which, when filled, may be quickly replaced by an empty one. It will thus be seen that practically all the grain that is lost from the straw during the operations of cutting and binding will be saved, thus not only materially adding to the profits of the farmer, but avoiding the sprouting of volunteer grain which when resulting in the mixing of crops, as it frequently does, is found highly objectionable.

Having thus described the invention, what is claimed as new, is:—

1. The combination with a harvester-binder having a straw elevator and a binder deck, said straw elevator including a bottom plate, of a receiving trough supported adjacent to the lower edge of the binder deck, a conveyer casing communicating with the discharge end of the trough and discharging on to the bottom plate of the straw elevator, screw conveyers in the trough and in the conveyer casing, said conveyers being provided with shafts having intermeshing bevel gears, and means for driving the conveyers.

2. The combination with a harvester-binder having a straw elevator and a binder deck, of a conveyer trough supported adjacent to the lower edge of the binder deck to receive loose grain, a driven conveyer in said trough, means for transferring material from the discharge end of the trough to the bottom plate of the straw elevator, and a grain platform connected with said bottom plate to receive loose grain discharged thereover.

3. The combination with a harvester-binder having a straw elevator and a binder deck, of a conveyer trough supported adjacent to the lower edge of the binder deck to receive loose grain, a driven conveyer in said trough, means for transferring material from the discharge end of the trough to the bottom plate of the straw elevator, and a grain platform connected with said bottom plate to receive loose grain discharged thereover; a driven endless apron supported above the platform and having slats engaging the same, a conveyer trough at the outer end of the platform, a driven screw conveyer in said trough, and an elevator arranged to receive material from said trough.

4. The combination with a harvester-binder having a straw elevator provided with a bottom plate and a movably supported grain deck, of a trough supported to receive loose grain from the grain deck, means for transferring such loose grain from the trough to the bottom plate of the straw elevator, means for transferring loose grain from the lower end of the bottom plate of the straw elevator to the outer end of the grain platform, a receiving trough at the outer end of said platform, a driven conveyer in said trough, an elevator to receive material at the discharge end of the trough, and a receptacle supported on the casing of the elevator.

In testimony whereof I affix my signature in presence of two witnesses.

DAVID W. BOHANNON.

Witnesses:
JAMES STEWART,
WM. DUNN.